United States Patent [19]
Boe

[11] Patent Number: 5,960,522
[45] Date of Patent: Oct. 5, 1999

[54] RIBBON CABLE ALLIGATOR CLAMP

[75] Inventor: Craig L. Boe, Nampa, Id.

[73] Assignee: Micron Electronics, Inc., Nampa, Id.

[21] Appl. No.: 08/859,893

[22] Filed: May 21, 1997

[51] Int. Cl.[6] ................................................. A44B 21/00
[52] U.S. Cl. ............................ 24/543; 24/30.5 P; 24/487
[58] Field of Search ........................ 24/543, 487, 30.5 P; 251/10

[56] References Cited

U.S. PATENT DOCUMENTS

| | | |
|---|---|---|
| 3,084,368 | 4/1963 | Kolk . |
| 3,171,184 | 3/1965 | Posse ........................................ 24/543 |
| 3,713,622 | 1/1973 | Dinger ...................................... 24/543 |
| 4,038,726 | 8/1977 | Takabayashi ............................. 24/543 |
| 4,192,965 | 3/1980 | Baum . |
| 4,325,526 | 4/1982 | Kitagawa . |
| 4,356,599 | 11/1982 | Larson et al. ............................ 24/543 |
| 4,406,916 | 9/1983 | Southerland . |
| 4,457,482 | 7/1984 | Kitagawa . |
| 4,536,924 | 8/1985 | Willoughby .............................. 24/543 |
| 4,635,886 | 1/1987 | Santucci et al. . |
| 4,650,925 | 3/1987 | Coldren . |
| 4,923,153 | 5/1990 | Matsui et al. ......................... 24/30.5 P |
| 5,230,489 | 7/1993 | White et al. . |
| 5,425,740 | 6/1995 | Hutchinson, Jr. . |
| 5,497,537 | 3/1996 | Robinson et al. . |
| 5,653,003 | 8/1997 | Freeman .................................... 24/543 |

FOREIGN PATENT DOCUMENTS

| | | |
|---|---|---|
| 576249 | 5/1959 | Canada . |
| 52-13996 | 2/1977 | Japan . |
| 6702594 | 8/1967 | Netherlands . |

*Primary Examiner*—Victor N. Sakran
*Attorney, Agent, or Firm*—Knobbe, Martens, Olson & Bear, LLP

[57] ABSTRACT

An apparatus for securing a folded section of ribbon cable. Two elongate members are connected to each other at a first end so as to be movable between an open position and a closed position. The ribbon cable is positioned adjacent the inner surfaces of the first and second members when the members are in the open position. The first and second members are then moved into a closed position wherein a securing device secures the first and second members against the tension of the folded ribbon cable. The securing or latching mechanism is preferably comprised of two serrated posts formed on one member that mates with two opening formed in the other member. A wedge in each of the two openings engages with the serrations to secure the two members together against the tension of the folded ribbon cable, however, the tip of the wedge elastically deforms when the posts are removed from the openings in response to an installer separating the two members.

25 Claims, 2 Drawing Sheets

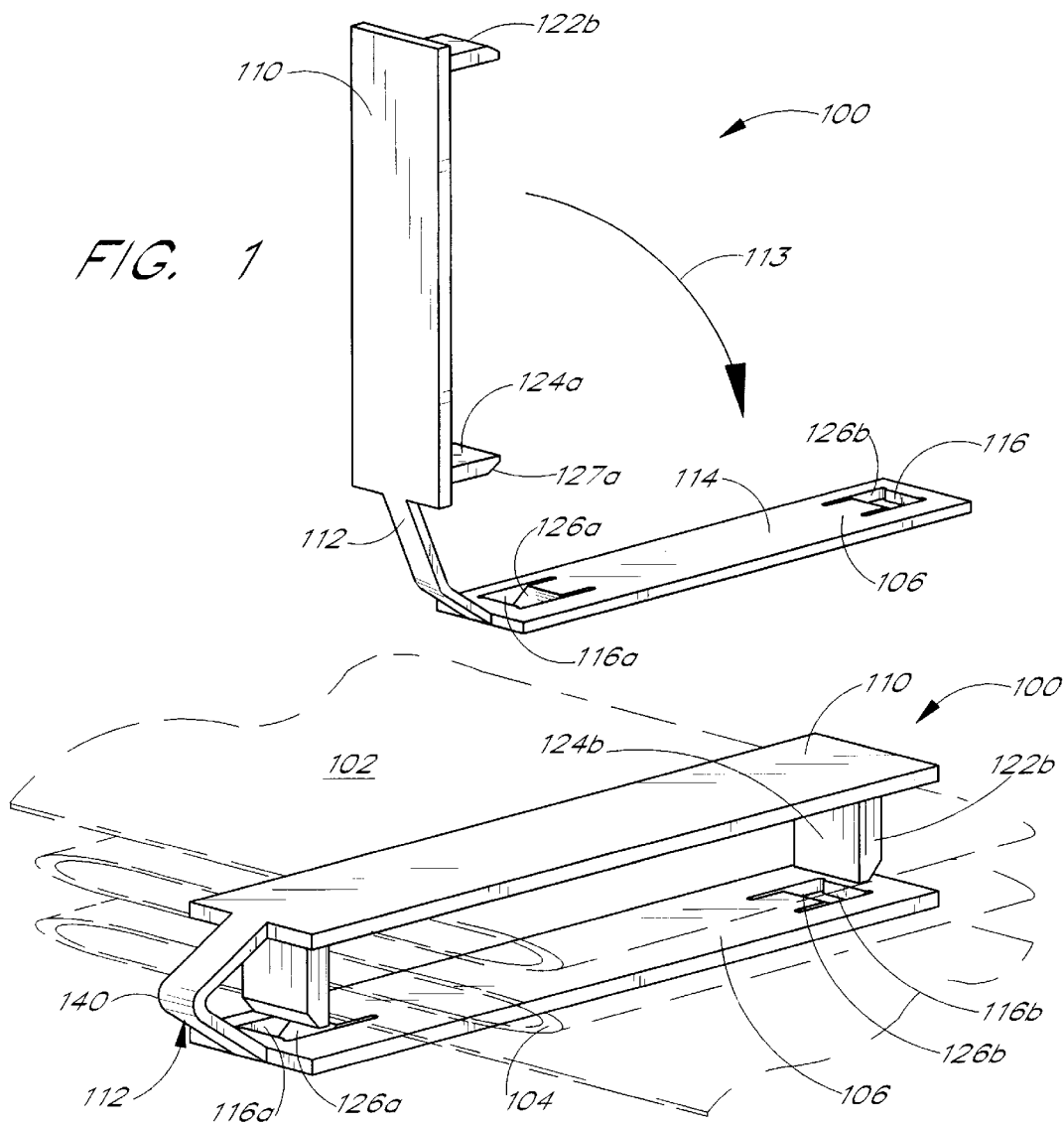
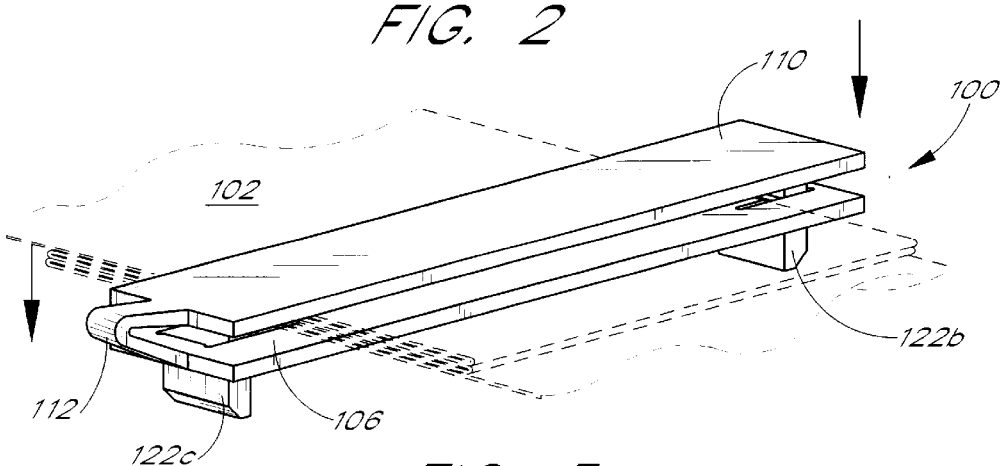

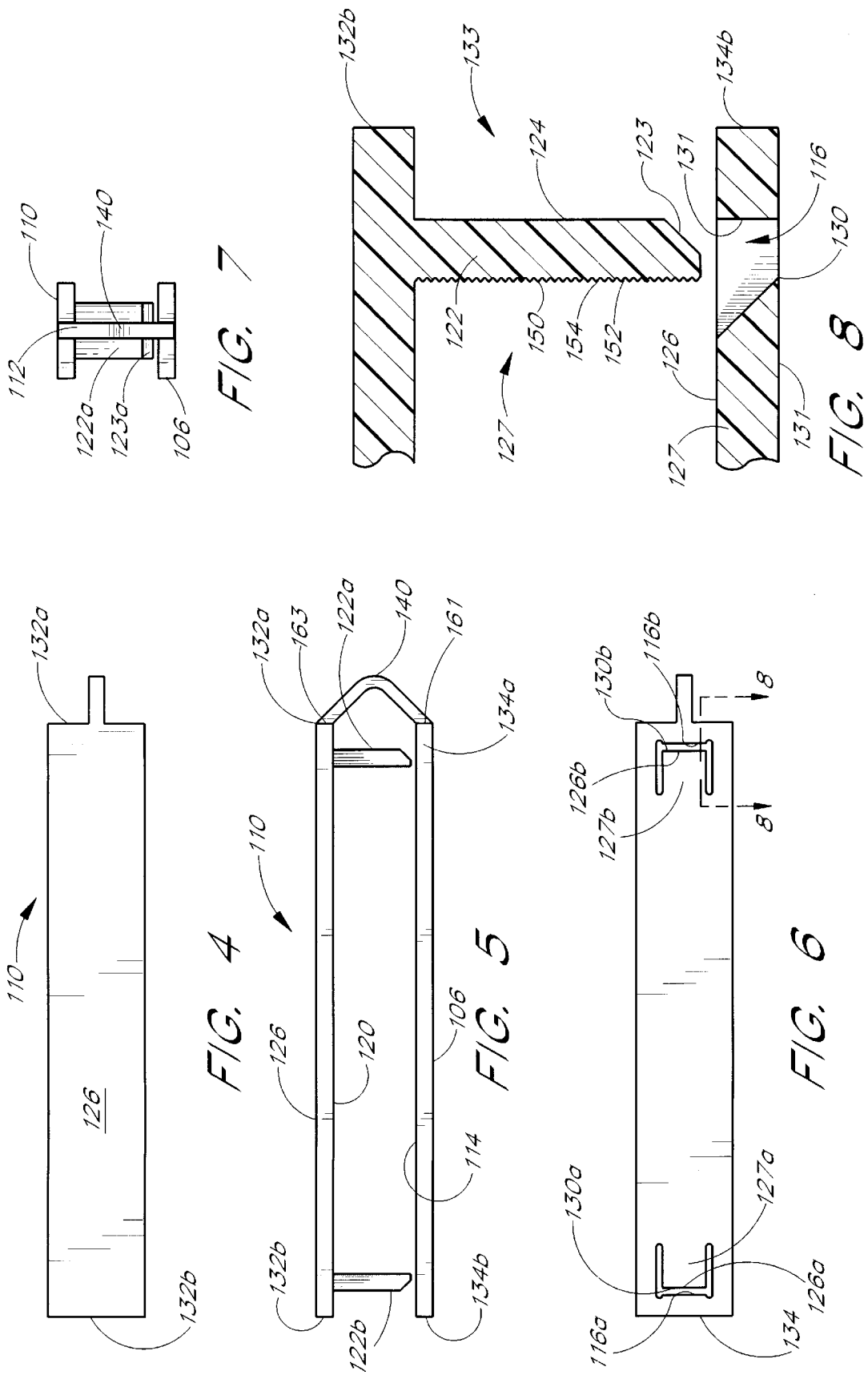

RIBBON CABLE ALLIGATOR CLAMP

BACKGROUND OF THE INVENTION

1. Field of the Invention

The present invention relates to an apparatus and a method for securing cable and, in particular, concerns an apparatus and a method for securing excess loops of ribbon cable.

2. Description of the Related Art

Ribbon cable is a type of cable that is used to interconnect computer devices. Ribbon cable is commonly used to interconnect computer motherboards with other components within a computer system and it can also be used to interconnect personal computers to other devices in a network. One typical application is to use ribbon cable to interconnect component devices that are linked in a SCSI interface network.

Ribbon cable is comprised of a plurality of conductors that are positioned so as to be coplanar. The conductors are typically embedded within insulation material that provides some protection to the conductors of the ribbon cable. A typical ribbon cable may, in fact, have forty or more conductors arranged side-by-side and embedded within an insulating material.

Oftentimes when ribbon cable is used to interconnect different devices, there is an excess amount of ribbon cable. This excess, or slack, in the ribbon cable can be caught during movement of computer devices or movement of items around the ribbon cable to the point where the ribbon cable may be damaged or dislodged from the computer devices. To address this particular problem, the excess or slack ribbon cable is often gathered and secured together through the use of wire ties. Wire ties are typically thin pieces of wire that are embedded within plastic that can be wrapped around a folded up section of excess ribbon cable to secure the excess ribbon cable together.

One difficulty with using wire ties to secure excess ribbon cable is that the wire ties can crimp the outermost conductors of the ribbon cable. This crimp in the outermost conductors of the ribbon cable can result in these conductors becoming separated at the crimped point. Once the conductors are separated, these conductors can no longer transmit data between the components of the computer system. Alternatively, the thin wire tie may exert sufficient force against the insulation of the ribbon cable to puncture or wear away the insulation thereby exposing the embedded conductors. Hence, while wire ties can be used to gather excess slack in the ribbon cable to avoid the excess ribbon cable becoming entangled, the use of wire ties can damage the ribbon cable.

As an alternative to wire ties, excess ribbon cable can be positioned within a clamp device which has a surface that receives the ribbon cable and extends across the full width of the ribbon cable. The ribbon cable can then be bent back and forth within the receiving surface following which a cover can be installed over the receiving surface so as to clamp the excess cable on the receiving surface. One such prior art clamp is manufactured by Richco Plastic Company of Chicago, Ill. and sold under the name of "Flat Cable Routing Clamp". While this clamp does allow for the capture of excess ribbon cable without the crimping problems associated with the use of wire ties, this type of clamp is cumbersome to use.

Specifically, this type of clamp is a two-part clamp wherein the cover is separate from the base. Hence, the installer has to position the ribbon cable on the base and hold the ribbon cable in position while simultaneously locating and installing the cover of the clamp device. However, excess ribbon cable is often gathered in locations where there is not a significant amount of room for the installer to work. Consequently, it can be very difficult to position the cover on the base while simultaneously retaining the loops of excess ribbon cable on the base.

To aid in the installation process, some clamps have been equipped with securing holes in the base to allow the base to be secured to a surface prior to positioning the excess ribbon cable within the base. While this does ease some of the problems associated with positioning the ribbon cable within the base during installation, this requires the additional step of mounting the base to a piece of adjacent equipment which is often not practical or possible.

Moreover, this type of clamp design is difficult to reuse. For example, the Richco device incorporates a locking mechanism that prevent easy removal once installed. Hence, if the installer wishes to access the slack to add components or reconfigure the system, the clamps inhibit an easy transition. This further limits the flexibility of using this type of clamp device as it limits the ability of the installer of the computer system to selectively modify the installation of the computer system and requires the installer to use new clamps.

Hence, from the foregoing, it will be appreciated that there is a need for a clamping device that can be used to gather and secure excess ribbon cable. This clamping device should be easy to use so that an installer can gather the ribbon cable and secure it within the clamping device without having to manipulate multiple parts. Moreover, there is a need for a clamping device that is reusable so that the installer can selectively disengage portions of the excess ribbon cable to permit connection to other devices or reconfiguration of the computer system.

SUMMARY OF THE INVENTION

The aforementioned needs are satisfied by the ribbon cable securing apparatus of the present invention which is comprised of a first member and a second member, wherein the first and second members are movably attached together and wherein the first and second members define a ribbon cable receiving area. The apparatus also includes a latching mechanism which latches the first and second members together to thereby securely retain the excess ribbon cable within the excess ribbon cable receiving area. The excess ribbon cable can be secured within the apparatus by repeatedly folding over the excess ribbon cable, positioning the excess ribbon cable within the ribbon cable receiving area, and then manipulating the first and second members so that the excess ribbon cable is captured within the ribbon cable receiving area and retained therein by the inner surfaces of the first and second members.

In one embodiment, the first member is a base member and the second member is a securing member and both the base member and the securing member extend in a first direction so that both members respectively define an elongate cable receiving surface that is configured to extend across the width of the ribbon cable. The excess ribbon cable is then folded back and forth adjacent the elongate ribbon cable receiving surfaces of either the base or securing member. The latching mechanism in this embodiment is comprised of a first and a second latching device which latches a first and a second end of the securing member and the base member together. In this embodiment, the latching mechanism acts so that the securing member exerts a substantially uniform amount of force against the folded excess ribbon cable to thereby capture the folded excess ribbon cable between the cable receiving surfaces of the base and securing members.

In one embodiment, the latching mechanism is a releasable latching mechanism which allows the installer to remove portions of the excess ribbon cable and then resecure the apparatus to capture the remaining excess ribbon cable. In one embodiment, the latching mechanism is comprised of two posts formed on the securing member wherein inner surfaces of both posts are serrated. The latching mechanism also includes two openings formed in the base member wherein a ridge of a partially deformable material is positioned within the openings so as to engage with the serrations on the post to thereby retain the posts in the openings. Hence, in this embodiment, the securing member can be secured to the base member by inserting the posts within the opening and moving the securing member proximate to the base member. The wedge is preferably made of a partially deformable material, such as plastic. The wedge can therefore be configured so as to exert sufficient force against the serrations to maintain the securing member at a desired fixed distance with respect to the base member against the tension of the folded excess ribbon cable while still permitting removal of the posts from the opening in response to the installer pulling the securing member away from the base member.

It will be appreciated that the apparatus facilitates the capture of excess ribbon cable within the clamp as the first and second members are connected to each other. Further, the latching mechanism of the first embodiment permits the excess ribbon cable to be securely retained within the clamp apparatus while still allowing for an installer to selectively disengage the clamp apparatus to thereby reposition the ribbon cable while still allowing the remaining excess ribbon cable to be resecured within the clamp apparatus. These and other objects and advantages of the present invention will become more fully apparent from the following description taken in conjunction with the accompanying drawings.

BRIEF DESCRIPTION OF THE DRAWINGS

FIG. 1 is a perspective view of a first embodiment of an excess ribbon cable clamp in an open sate;

FIG. 2 is a perspective view of the excess ribbon cable clamp apparatus of FIG. 1 in a partially open state;

FIG. 3 is a perspective view of the excess ribbon cable clamp apparatus of FIG. 1 in a closed position;

FIG. 4 is a top view of the excess ribbon cable clamp apparatus of FIG. 1;

FIG. 5 is a side view of the excess ribbon cable clamp apparatus of FIG. 1;

FIG. 6 is a bottom view of the excess ribbon cable clamp apparatus of FIG. 1;

FIG. 7 is an end view of the excess ribbon cable clamp apparatus of FIG. 1; and

FIG. 8 is a partial cut away view of a portion of the ribbon cable clamp apparatus of FIG. 1 illustrating one embodiment of the latching mechanism in greater detail.

DETAILED DESCRIPTION OF THE INVENTION

Reference will now be made to the drawings wherein like numerals refer to like parts throughout. FIGS. 1 through 3 illustrate one embodiment of an excess ribbon cable clamp apparatus 100 that is used to secure an excess portion 104 (shown in phantom in FIGS. 2 and 3) of a ribbon cable 102. The ribbon cable clamp 100 includes a first or base member 106 and a second or securing member 110 that are connected together via an attachment member 112. The base member 106 defines an inner, cable receiving, surface 114 that is configured to be positioned adjacent the excess ribbon cable 104. In particular, the surface 114 may be dimensioned so as to receive the excess ribbon cable 104 along the full width of the ribbon cable 102. As shown in FIGS. 1 through 3, the excess ribbon cable 104 may be positioned adjacent the ribbon cable receiving surface 114 so as to be folded multiple times.

The base member 106 also includes two openings 116a and 116b that are used to latch or secure the securing member 110 to the base member 106 in a manner that will be described below. The openings 116 may be positioned so as to reside at the outer lateral edges of the cable receiving surface 114 of the base member 106.

The securing member 110 is also elongate so as to extend in the same direction as the base member 106. The inner surface of the securing member 110 also defines a cable receiving surface 120. As will be described in greater detail below, the excess ribbon cable 104 may be captured in an excess cable receiving area between the securing surface 114 of the base member 106 and the surface 120 of the securing member 110 in the manner shown in FIG. 3.

As shown in FIGS. 1 and 2, the securing member 110 and the base member 106 are connected by the attachment member 112. The attachment member 112 permits movement of the securing member 110 with respect to the base member 106, and vice versa, in the manner shown in FIGS. 2 and 3. In particular, the securing member 110 can be moved with respect to the base member 106 in an arc defined by the arrow 113 in FIG. 1 so that the securing member 110 and the base member 106 move with respect to each other in the arc 113 within a common plane that is preferably normal to the planes of both the inner receiving surfaces 114 and 120. The attachment member 112 will be described in greater detail below in reference to FIG. 5.

The securing member 110 also includes two latching members 122a and 122b which extend perpendicularly out of the cable receiving surface 120 of the securing member 110. The latching members 122a and 122b may be positioned so as to be at the outer edges of the cable receiving surface 120 of the securing member 110. The latching members 122a and 122b are also configured to be positioned within the openings 116a and 116b, respectively, in the base member 106 and engage with the openings 116 so as to retain the securing member 110 in a desired space relationship from the base member 106 with the excess ribbon cable 104 captured between the base member 106 and the securing member 110.

As shown in FIGS. 1 through 3, the latching members 122a and 122b may be rectangular in cross-section so as to extend substantially across the width of the securing member 110. The latching members 122a and 122b therefore present a perpendicular inner surface 124 which extends outward from the ribbon cable receiving surface 120 of the securing member 110. The perpendicular inner surfaces 124 of the latching members 122a and 122b thereby facilitate positioning of the excess ribbon cable 104 adjacent the cable receiving surface 120 of the securing member 110. The engagement between the latching members 122a and 122b of the securing member 110 and the openings 116a and 116b of the base member 106 will be described in greater detail below in reference to FIG. 8.

FIGS. 4 through 8 illustrate the configuration of the basic components of the clamp 100 in greater detail. In particular, referring to FIG. 4, an upper surface 126 of the securing member 110 is shown. In one embodiment, the securing member 110 has dimensions of approximately 2.93 inches in length by 0.50 inches in width. Referring to FIG. 5, the two latching members 122a and 122b are approximately 0.41 inches long by 0.065 inches thick and are spaced 0.19 inches inward from the outer ends 132a and 132b of the securing member 110. The cable receiving surface 120 of the securing member 110 is, in this embodiment, approximately 2.55 inches wide.

FIG. 6 illustrates the bottom surface of the base member 106. The bottom surface of the base surface 106 is approximately 2.92 inches long by 0.391 inches wide. The openings 116 are spaced so as to be 0.19 inches from the ends 134a and 134b of the base member 106 and are spaced so as to be approximately 0.110 inches from the lateral edges of the base member 106.

As is also shown in FIG. 6, a wedge 126a and 126b is formed in each of the openings 116a and 116b on the surface of the opening 116a and 116b adjacent the cable receiving surface 114 of the base member 106. The wedges 126a and 126b form a portion of the latching mechanism which secures the securing member 110 in a fixed relationship to the base member 106 to thereby retain the excess ribbon cable 104 between the base member 106 and the securing member 110. In this embodiment, the wedges 126a and 126b are respectively mounted at the ends of cantilevered members 127a and 127b. The cantilevered members 127a and 127b provide greater flexibility for the wedges 126a and 126b. In the embodiment shown, the wedges 126a and 126b are approximately 0.013 inches thick and are formed so that the apex 130 of the wedges 126a and 126b are positioned in the openings 116a and 116b so that the apex 130 is adjacent the outer surface 131 of the base member 106 in the manner shown in FIG. 8. Further, the upper surfaces of the wedges 126a and 126b may form an approximately 30°–45° angle to the lower surface 131 terminating at the apex 130.

FIGS. 5 and 7 illustrate the attachment member 112 in greater detail. Specifically, the attachment member 112 is comprised of a deformable material, such as plastic, that is attached to a first end 132a of the securing member 110 and a first end 134a of the base member 106. As is shown in FIG. 5, the attachment member 112 is preformed so as to have a generally triangular cross-section which thereby allows the securing member 110 to pivot about a pivot point 140 at the apex of the triangular attachment member 112.

Preferably, the joint 161 between the attachment member 112 and the base member 106 and the joint 163 between the attachment member 112 and the securing member 110 are flexible joints. Specifically, in one embodiment the joints 161 and 163 are configured to allow the base member 106 and the securing member 110 to move with respect to the attachment member 112. This allows the base member 106 and the securing member 110 to be moved towards each other where the inner receiving surface 114 of the base member 106 is substantially parallel to the inner receiving surface 120 of the securing member 110. When the excess ribbon cable 104 is positioned and captured between the base member 106 and the securing member 110, the inner surfaces 114 and 120 of the base member 106 and the securing member 110 preferably exert a substantially uniform force against the excess ribbon cable 104 along the entire width of the ribbon cable 104. The application of a substantially uniform force reduces the likelihood of the insulation surrounding individual conductors within the ribbon cable 104 being damaged or worn as a result of being positioned within the apparatus 100.

Hence, the outer end 132b of the securing member 110 can be moved with respect to the base member 106 or vice versa so that both the receiving surface 114 of the base member 106 and the receiving surface 120 of the securing member 110 are accessible to allow the excess ribbon cable 104 to be positioned adjacent the surfaces 114 and 120. In one embodiment, the base member 106, the securing member 110, and the attachment member 112 are made of a molded flexible plastic, such as PVC plastic.

FIG. 8 illustrates the configuration of one embodiment of the latching mechanism in greater detail. In particular, a plurality of serrations 150 are formed on an inner surface 127 of both of the latching members 122a and 122b. These serrations 150 are formed so that the surfaces of the serrations extend at approximately 45° angles to each other. In one embodiment, the openings 116a and 116b and the latching members 122a and 122b are sized so that when the latching members 122a and 122b are positioned within the openings 116a and 116b the wedges 130a and 130b engage with the serrations 150 on the outer surfaces 127 of the latching members 122a and 122b to secure the latching members 122a and 122b within the openings 116a and 116b in the manner shown in FIG. 3.

Specifically, the serrations 150 form a plurality of indentations 152 with a plurality of apexes 154 interposed between each indentation 152. The apexes 154 extend outward from the latching member 122 so that the entire thickness of the latching member 122 from an apex 154 of the serrations 150 to the outer surface 124 of the latching member 122 is greater than the distance between the apex 130 of the wedge 126 and an inner wall 131 of the opening 116. However, the thickness of the latching member 122 between an indentation 152 of the serrations 150 and the outer surface 124 of the latching member 122 is more than the distance between the apex 130 of the wedge 126 and the inner surface 131 of the opening 116.

Further, the wedge 126 and cantilevered member 127 may also be made of a flexible plastic so that the apex 130 of the wedge 126 deforms and bends in response to insertion of the locking member 122 into the opening 116. To facilitate placement of the latching member 122 in the opening 116, the outer bottom surface 123 of the latching member 122 may be angled thereby directing the latching member 122 into the opening 116. The apex 130 of the wedge 126 then rests in one of the indentations 152 of the serrations 150 and thereby retains the latching member 122 in the opening 116.

The material selected to form the apex 130 of the wedge 126 and the cantilevered member 127 may be selected so that the tension of the folded excess ribbon cable 104 will not dislodge the apex 130 of the wedge 126 from an indentation 152 in the serrated surface 150 of the latching member 122. However, the wedge 130 should be configured so that the apex 130 and/or the member 127 will elastically deform and bend in response to an installer pulling the securing member 110 and the base member 106 apart.

Hence, the locking members 122 and the openings 116 form a latching mechanism 133 which can secure the securing member 110 to the base member 106 at a fixed distance between these two members. Further, the latching mechanism 133 of this embodiment is also configured so that the installer can readily separate the base member 106 and the securing member 110 and reconfigure the excess ribbon cable 104 and then resecure the base member 106 and the locking member 110.

The use of the clamp apparatus 100 will now be described in reference to FIGS. 1 through 3. As shown in FIG. 1, the securing member 110 can initially be positioned away from the base member 106 so that excess ribbon cable 104 can be folded and positioned adjacent either the cable receiving surface 114 of the base member 106 or the cable receiving surface 120 of the securing member 110. The excess ribbon cable 104 is folded with a sufficient distance between the folds so that when the apparatus 100 is mounted on the excess ribbon cable 104 the conductors within the ribbon cable are not crimped. As is shown in FIG. 5, the cable receiving surface 120 of the securing member 110 is bounded by the locking members 122a and 122b. Hence, positioning of the folds of the excess cable 104 adjacent the cable receiving surface 120 of the securing member 110 is aided by the inner surfaces of the locking members 122a and 122b.

Once the excess ribbon cable 104 is folded adjacent the cable receiving surface 114 of the base member 106 or the cable receiving surface 120 of the securing member 110, the securing member 110 and base members 106 are then moved together so that the latching members 122a and 122b are positioned adjacent the openings 116a and 116b in the base member 106. The locking members 122a and 122b are then inserted into the openings 106 and retained in the openings 116a and 116b by the wedges 126 in the manner described above.

Hence, as shown in FIG. 3, the securing member 110 can be positioned so as to compress the excess ribbon cable 104 between the cable receiving surfaces 114, 120 of the base member 106 and the securing member 110, respectively. This results in the excess cable 104 being gathered so as to reduce the slack in the cable which could be entangled. Further, as a result of the flexible joints 161 and 163 attaching the attachment member 112 to the base member 106 and the securing member 110, the base and securing members preferably exert a substantially uniform force across the width of the folded excess ribbon cable 104.

It will be appreciated that the flexible attachment member 112 facilitates positioning of the excess ribbon cable 104 into the clamp 100 as the installer does not have to simultaneously hold the folded ribbon cable in one portion of the clamp while searching for and installing the other portion of the clamp. Moreover, the use of a reusable latching mechanism facilitates reconfiguring the ribbon cable.

Although the foregoing description of the preferred embodiment of the present invention has shown, described, and pointed out the fundamental novel features of the invention, it will be understood that various omissions, substitutions and changes in the form of the detail of the apparatus as illustrated, may be made by those skilled in the art without departing from the spirit of the present invention. Consequently, the scope of the invention should not be limited to the foregoing discussion, but should be defined by the appended claims.

What is claimed is:

1. An apparatus for capturing excess ribbon cable comprising:
   a first member having a first and a second end and having two posts located adjacent the first and second ends which defines a first ribbon cable receiving surface, wherein the two posts each form an outer boundary of the ribbon cable receiving surface of the first member so that excess ribbon cable can be folded and positioned into the ribbon cable receiving surface between the two posts;
   a second member having a first and a second end which defines a second ribbon cable receiving surface wherein the second member is connected to the first member so that the first and the second members can be moved with respect to each other over a range of motion between an open and a closed position, wherein the second member includes two openings that are spaced so as to be adjacent an outer boundary of the ribbon cable receiving surface of the second member and so as to receive the two posts extending outward from the ribbon cable receiving surface of the first member; and
   a latching mechanism which engages the first and the second member so as to secure the first and the second members together in the closed position when an excess portion of a ribbon cable is positioned adjacent the ribbon cable receiving surfaces of the first and the second members so that the excess ribbon cable is securely retained between the first and the second members, wherein the latching mechanism is comprised of serrations formed on a surface of the two posts of the first member and two wedges formed in the two openings of the second member, wherein the two wedges engage with the serrations so as to retain the posts within the openings so that a fixed spaced relationship is maintained between the first and second members when the excess ribbon cable is captured between the cable receiving surface of the first and second members.

2. The apparatus of claim 1, further comprising an attachment member which interconnects the first end of the first member and the first end of the second member so that the second ends of the first and second members can be moved with respect to each other over the range of motion between an open position, wherein the excess ribbon cable can be positioned between the first and second members, and a closed position, wherein the first and second members are positioned so that the excess ribbon cable is retained between the ribbon cable receiving surfaces of the first and second members.

3. The apparatus of claim 2, wherein the attachment member defines a pivot point which permits the first and second members to pivot with respect to each other while the range of movement is within a single plane.

4. The apparatus of claim 1, wherein the latching mechanism allows the first and second members to be repeatedly moved with respect to each other over the range of motion between the open and closed position.

5. The apparatus of claim 1, wherein the first and second members are attached to each other so that, when the excess portion of ribbon cable is positioned between the first and second members and is retained therein, the first and second ribbon cable receiving surfaces exert a substantially uniform force against the ribbon cable along the length of the first and second ribbon cable receiving surfaces.

6. The apparatus of claim 1, wherein the latching mechanism is comprised of serrations formed on a surface of the two posts of the first member and two wedges formed in the two openings of the second member wherein the two wedges engage with the serrations so as to retain the posts within the openings so that a fixed spaced relationship is maintained between the first and second members when the excess ribbon cable is captured between the cable receiving surfaces of the first and the second members.

7. The apparatus of claim 1, wherein the wedges and the serrations are formed so that the wedges are positioned within indentations in the serrations when the first and second members are in the closed position so that the engagement between the wedges and the indentations secure the first and second members in the closed position.

8. The apparatus of claim 7, wherein the wedge is made of a deformable material so that when an installer urges the first and the second members apart from the closed position, the tip of the wedge elastically deforms as a result of contact with the serrations and thereby allows the first and second members to be positioned in the open position.

9. An apparatus for capturing and retaining a folded section of ribbon cable comprising:

a first elongate member having a first and a second end and having an inner and an outer surface wherein two posts are formed on the inner surface adjacent the first and the second ends forming an outer boundary of a ribbon cable receiving area and wherein serrations are formed on each of the two posts;

a second elongate member having a first and a second end and having an inner and an outer surface wherein the first and the second elongate members are connected to each other so as to be movable between an open position, wherein the folded sections of the ribbon cable can be positioned between the inner surfaces of the first and second elongate members and a closed position wherein the folded section is retained between the inner surfaces of the first and second elongate members wherein two openings having wedges positioned therein are formed in the inner surface of the second elongate members spaced so as to receive the two posts of the first elongate member; and a securing mechanism for securing the first and second elongate members in the closed position to thereby retain the folded section of the ribbon cable therebetween, wherein the securing mechanism is configured to allow for repeated securing of the first and second members in the closed position wherein the securing mechanism is comprised of the serrations formed on the posts and the two wedges formed in the two openings such that the two wedges engage with the serrations so as to retain the posts within the openings.

10. The apparatus of claim 9, wherein the first and second elongate members are attached to each other so that when the portion of ribbon cable is positioned between the first and second members and the first and second elongate members are in the closed position, the inner surfaces of the first and second elongate members exert a substantially uniform force against the ribbon cable along the length of the inner surfaces.

11. The apparatus of claim 9, further comprising an attachment member which interconnects the first end of the first elongate member and the first end of the second elongate member so that the second ends of the first and second elongate members can be moved with respect to each other between the open and closed position.

12. The apparatus of claim 11, wherein the attachment member defines a pivot point which permits the first and second elongate members to pivot with respect to each other between the open and closed position over a range of movement that is within a single plane.

13. The apparatus of claim 9, wherein the wedges and the serrations are formed so that the wedges are positioned within indentations in the serrations when the first and second elongate members are in the closed position so that the engagement between the wedges and the indentations secure the first and second elongate members in the closed position.

14. The apparatus of claim 13, wherein the wedges are made of a deformable material so that when an installer urges the first and the second elongate members apart from the closed position, the tip of the wedge elastically deforms as a result of contact with the serrations and thereby allows the first and second elongate members to be positioned in the open position.

15. An apparatus for capturing a folded over section of ribbon cable comprising:

a first member having a first and a second end and a first ribbon cable receiving surface that is dimensioned to receive a ribbon cable of a first width;

a second member having a first and a second end and a second ribbon cable receiving surface that is dimensioned to receive the ribbon cable of the first width;

an attachment member connected to the first end of the first and second members so as to permit movement of the first and second members with respect to each other between an open position, wherein the attachment member includes a pivot point to enable the first and second members to pivot with respect to each other and wherein the first and second members are pivotally attached to the attachment member to permit pivoting movement of the first and second members relative to the attachment member, wherein the folded section of ribbon cable can be positioned adjacent the first and second ribbon cable receiving surfaces, and a closed position wherein the folded section of ribbon cable is captured between the first and second ribbon cable receiving surfaces of the first and second members;

a post formed on the first member so as to be positioned adjacent the first ribbon cable receiving surface; and an opening formed in the second member so as to be positioned to receive the post when the first and second members are in the closed position to thereby retain the first and second members in the closed position against the tension of the folded section of ribbon cable and wherein the pivoting attachment between the first and second members and the attachment member permits the first and second members to be horizontally aligned during engagement of the post in the opening so that the inner surfaces of the first and second members are substantially parallel to each other during engagement of the post and the opening.

16. The apparatus of claim 15, further comprising a securing mechanism for securing the first and second members in the closed position to thereby retain the folded section of the ribbon cable therebetween, wherein the securing mechanism is configured to allow for repeated securing of the first and second members in the closed position.

17. The apparatus of claim 16, wherein the securing mechanism is comprised of serrations formed on a surface of the post of the first member and a wedge formed in the opening of the second elongate member wherein the wedge engages with the serrations so as to retain the post within the opening so that a fixed spaced relationship is maintained between the first and second members when the folded section of ribbon cable is captured between the first and second members.

18. The apparatus of claim 17, wherein the wedge and the serrations are formed so that the wedge is positioned within indentations in the serrations when the first and second members are in the closed position so that the engagement between the wedge and the indentations secure the first and second members in the closed position against the tension of the folded section of the ribbon cable.

19. The apparatus of claim 15, wherein the wedge is made of a deformable material so that when an installer urges the first and the second members apart from the closed position, the tip of the wedge elastically deforms and bends as a result of contact with the serrations and thereby allows the first and second members to be positioned in the open position.

20. An apparatus for capturing a folded over section of ribbon cable comprising:

a first member having a first and a second end and having an inner and an outer surface;

a second member having a first and a second end and having an inner and an outer surface;

means for attaching the first and second member so that the first and second members are attached to each other so as to be movable between an open position, wherein the folded section of the ribbon cable can be positioned between the inner surfaces of the first and second members, and a closed position wherein the folded section is retained between the inner surface of the first and second member wherein the means for attaching include a pivot point to enable the first and second members to pivot with respect to each other and wherein the first and second members are pivotally attached to the attaching means to permit pivoting movement of the first and second members relative to the attaching means; and securing means for releasably securing the first and second members in the closed position to thereby retain the folded section of the ribbon cable therebetween wherein the pivoting attachment between the first and second members and the attaching means permits the first and second members to be horizontally aligned during engagement of the securing means so that the inner surfaces of the first and second members are substantially parallel to each other during engagement of the securing means.

21. The apparatus of claim 20, wherein the first and second members are attached to each other so that when the portion of ribbon cable is positioned therebetween and the first and second members are in the closed position, the inner surfaces of the first and second members exert a substantially uniform force against the ribbon cable along the length of the inner surfaces.

22. The apparatus of claim 20, wherein the means for attaching the first and second members comprises an attachment member that is connected to the first end of the first and second members and defines a pivot point which permits the first and second members to pivot with respect to each other between the open and closed position over a range of movement that is within a single plane.

23. The apparatus of claim 20, wherein the securing means comprises:

a post formed on the first member so as to be positioned adjacent a first ribbon cable receiving surface; and an opening formed in the second member so as to be positioned to receive the post when the first and second members are in the closed position to thereby retain the first and second members in the closed position against the tension of the folded section of ribbon cable.

24. The apparatus of claim 23, wherein the securing means further comprises serrations formed on the surface of the post and a wedge formed in the opening wherein the wedge engages with the serrations so as to retain the post within the opening so that a fixed spaced relationship is maintained between the first and second members when the folded section of ribbon cable is captured between the first and second members.

25. The apparatus of claim 24, wherein the wedge is made of a deformable material so that when an installer urges the first and second members apart from the closed position, the tip of the wedge elastically deforms as a result of contact with the serrations and thereby allows the first and second members to be positioned in the open position.

* * * * *

UNITED STATES PATENT AND TRADEMARK OFFICE
CERTIFICATE OF CORRECTION

PATENT NO. : 5,960,522
DATED : October 5, 1999
INVENTOR(S) : Craig L. Boe

It is certified that error appears in the above-identified patent and that said Letters Patent is hereby corrected as shown below:

Column 3, line 46, please remove "open sate" and replace therefore with --open state--.

Signed and Sealed this

Fifteenth Day of May, 2001

Attest:

NICHOLAS P. GODICI

Attesting Officer        Acting Director of the United States Patent and Trademark Office